Patented Dec. 5, 1933

1,937,521

UNITED STATES PATENT OFFICE 1,937,521

PROCESS FOR THE MANUFACTURE OF SULPHONIC ACIDS OR THEIR SALTS

Hyman Limburg, Amsterdam, Netherlands, assignor to The Flintkote Corporation, Boston, Mass., a corporation of Massachusetts No Drawing. Application October 16, 1930, Serial No. 489,241, and in the Netherlands October 19, 1929

15 Claims. (Cl. 260—159)

In the production of sulphonic acids by subjecting organic compounds to the action of sulphuric acid or fuming sulphuric acid, the sulphonated products are found to be more or less contaminated with sulphuric acid and sulphurous acid, whilst also the so-called lignine sulphonic acids from sulphite-lye are contaminated with electrolytes.

For various uses the presence of inorganic acids or salts in sulphonic acids is objectionable.

It appears, for instance, in the use of sulphonic acids as emulsifier for so-called soluble oil that the inorganic salts, such as sodium sulphate, often crystallize out after some length of time, thus causing obstructions in the pump lines and other connections. Further it appears that when sulphonic acids are used as emulsifier for asphalt and the like substances the salts contained in the acids have a flocculating action on the emulsion and consequently render the emulsifier unsuitable.

Now according to the present invention sulphonic acids or their salts are obtained in a sufficiently pure state for technical purposes from an aqueous liquid in which they occur together with electrolytes. The invention is based on the fact that organic bases, such as e.g. aniline, do not combine with these electrolytes or only form such compounds as are soluble in water, whereas with the sulphonic acids to be purified they form compounds that are insoluble in water. Thus the process according to the invention consists in treating the aqueous liquid containing the sulphonic acids to be purified with any suitable organic base, for instance aniline, whereupon the compounds of the organic base and the sulphonic acids thereby precipitated are separated from the rest of the aqueous liquid, after which the said acids or their salts may be liberated from these compounds.

The invention will now be described more specifically in connection with its application to the production of sulphonic acids in a pure state from the acid sludge formed in the treatment of a mineral oil with sulphuric acid, though it is by no means restricted to this mode of application. In this case the raw material used in the performance of the process according to the invention may be the acid sludge itself, e.g. such as produced in the acid treatment of the $SO_2$-extract from mineral oil, in particular spindle oil, or such as produced in the first acid treatment or treatments of the $SO_2$-raffinate from this oil. If on the other hand, acid sludge is used which is formed in the later treatments with sulphuric acid in view of the more intensive refining of mineral oil, then a large part of the sulphuric acid can already be removed by a preliminary treatment. This pretreatment consists in adding a not too large quantity of water, whereby two layers are formed. One layer contains the greater part of the sulphonic acids originally present in the acid sludge mixed with some sulphuric acid and water, whilst the other layer consists of diluted sulphuric acid in which some sulphonic acid remains dissolved. Thus by separating the latter layer a large part of the sulphuric acid originally contained in the acid sludge is removed, and in this case the separated sulphonic acids form the raw material for the process according to the invention.

The raw material, i. e. the acid sludge or crude sulphonic acid, is first dissolved in water, whereupon aniline or any other suitable organic base is added to the aqueous solution. The sulphuric acid in the solution is thereby converted into aniline sulphate which is soluble in water, and the sulphonic acids into aniline sulphonates which, being insoluble, settle out of the aqueous liquid. The consistency of the precipitated aniline sulphonate is proportionate to that of the sulphonic acids and varies at ordinary temperature from that of a thick syrup to a moderate viscosity. In order to avoid the difficulties arising in the treatment of viscous masses, according to the invention an excess of aniline is used, taking advantage of the circumstance that aniline sulphonate is soluble in aniline. In this way two layers are formed viz. an aqueous top layer containing all the sulphuric acid in the form of aniline sulphate and also some free aniline, and a bottom layer consisting of a solution of aniline sulphonate in aniline, which at ordinary temperature is of a thin liquid consistency. It will be obvious that the quantity of water must be sufficient to keep all the aniline sulphate dissolved at the temperature used in the process, which preferably should be 80–90° C.

These two layers, which separate quite distinctly and after a very short time, may be easily removed from each other, whereupon each of them is treated further separately and in an appropriate manner.

The bottom layer (aniline sulphonate layer) is first neutralized with alkali or ammonia, and then the aniline and water are distilled off, for instance in vacuum. As the distillation proceeds the solution turns to a viscid consistency and finally a solid, brittle and easily pulverizable mass of sulphonic acid salts is obtained. It is to be noted that in the preparation of ammonium sulphonates, in view of the relative affinities of ammonia and aniline, the aniline must be distilled off, either in vacuum or by a steam or the like distillation.

It is recommendable to carry out the distillation in a still provided with stirring device. In many cases the final product will be obtained directly in the form of a fine powder, mostly of a dark brown colour. The acids can be prepared from the salts in any known manner. The aniline distilled off is ready for use again in a following operation.

There are various ways in which the top layer (aniline sulphate) may be treated. In one embodiment of the process according to the invention this layer is treated with quick or hydrated lime, whereby calcium sulphate is precipitated and the aniline made free. After the gypsum has been removed the aqueous aniline solution can be used for dissolving further batches of sulphonic acids to be purified as described above.

According to another method which has proved highly recommendable, after being separated from the bottom layer the top layer is cooled down to about 25–20° C., whereby the greater part of the aniline sulphate is precipitated in a well crystallized condition. According to the invention the remaining mother-liquor is used for dissolving fresh batches of crude sulphonic acids to be purified. Further I have found that the aniline can be perfectly recovered from the crystal mass by treating the latter with magnesium oxide, magnesium carbonate, basic magnesium carbonate or the like. Magnesium sulphate is thereby produced, which dissolves in the water retained by the crystallized aniline sulphate, whilst the greater part of the aniline made free passes into a separate layer and can be returned at once into the process for re-use. The very small quantity of aniline still remaining in the magnesium sulphate solution can be extracted by means of a steam injection.

The process according to the invention, which is absolutely safe in working, can be applied to all sulphonic acids produced from mineral oil, as also to various sulphonic acids produced from other sources, as for instance from residual sulphite lye. From the crude liquors to be purified the sulphonic acids are recovered quantitatively and in a very pure state. Instead of aniline, other organic bases, such as toluidine, propylamine, butylamine, amylamine, triathanolamine, allylamine, benzylamine, cyclohexylamine and the like can be used. The organic base used in the process will preferably be of such volatility that it can readily be distilled off from the alkali sulphonates which are obtained in solution in said base.

Example I

A spindle oil fraction is treated with 10% (by weight) of fuming sulphuric acid ($SO_3$ content 20%) five times in succession, the acid sludge from each successive acid treatment being kept separate. The acid sludge from the fifth treatment is mixed with 150% (by weight) of water, two layers then being formed. The sulphonic acid layer is dissolved in ten times its weight of water, and to this solution, heated at 80–90° C., 150% of aniline, calculated on the crude sulphonic acid, is added. The bottom layer thereby formed, consisting of a solution of aniline sulphonate in aniline, is neutralized with alkali and the water and aniline are distilled off. The aqueous top layer is cooled down to 25–30° C., whereupon a crystal mass of aniline sulphate settles out. After separation from the crystals the mother-liquor is returned into the process for dissolving fresh batches of crude sulphonic acids. To the wet crystal mass an equal quantity of magnesium oxide is added, if necessary with addition of sufficient water to dissolve the magnesium sulphate thereby formed. The aniline forming a separate layer is drawn off and is ready to be used again in a following operation and the aqueous magnesium sulphate solution is freed from the aniline remaining therein by a steam injection.

Example II

A residual sulphite liquor from a sulphite paper pulp process is treated with 10% by weight of concentrated hydrochloric acid, after which as much aniline is added as is required to bring about the settling of the sulphonic acids contained in the liquor in the form of aniline salts in the bottom layer. This layer is separated from the supernatant layer, washed out with water and treated with as much sodium hydroxide as to give a neutral reaction when using alkali blue in an alcohol benzole mixture as indicator. Finally the aniline is removed by evaporation and purified sodium salts of the sulphonic acids originally contained in the sulphite liquor are obtained.

Example III

From a spindle oil fraction which has been treated with sulphuric acid or fuming sulphuric acid and from which the acid sludge has been separated, the oil-soluble sulphonic acids and, if any, the naphthenic acids are extracted with alcohol or some other suitable solvent. After the solvent has been distilled off the extracted acids are dissolved in about ten times their weight of water, and to this solution as much aniline is added as to cause the sulphonic and naphthenic acids to be completely precipitated. The separated aniline salts of sulphonic and naphthenic acids are then neutralized with potassium hydroxide, after which the aniline is distilled off and the purified potassium salts of the sulphonic and naphthenic acids are left behind.

The products obtained according to this invention are extraordinarily suitable, according to their nature, as emulsifiers or stabilizers in the manufacture of dispersions. They more particularly lend themselves to the manufacture or stabilization of asphalt emulsions and to the stabilization of natural dispersions such as rubber latex, whilst some of them can advantageously be used in the manufacture of so-called soluble oil.

Further the purified products are highly suitable for the breaking or de-emulsifying of emulsions of an aqueous phase in a non-aqueous phase such as petroleum emulsions and the like.

I claim:

1. A process for the manufacture of sulphonic acids in a purified condition from an aqueous liquid in which they occur together with electrolytes, in which the said aqueous liquid is treated with an organic base such as with which said electrolytes form no compounds or only such compounds as are soluble in water, and the thereby precipitated compounds of the organic base and sulphonic acids are separated from the remaining aqueous liquid.

2. A process according to claim 1, in which the precipitated compounds of the organic base and sulphonic acids after separation from the remaining aqueous liquid are treated with an agent capable of liberating the sulphonic acids out of said compounds, and separating the sulphonic acids or their salts from the organic base.

3. The process according to claim 1 in which the precipitated compounds of the organic base and sulphonic acids after separation from the remaining aqueous liquid are treated with an alkali in order to separate sulphonic acids from the organic base.

4. A process according to claim 1, in which a sufficient excess of organic base is used to dissolve the precipitated compounds of the organic base and sulphonic acids.

5. A process according to claim 1, in which the organic base contained in the remaining aqueous liquid is recovered with simultaneous precipitation of the electrolyte and the base recycled for further treatment of the aqueous liquid containing the sulphonic acids.

6. A process according to claim 1, in which part of the salts of the organic base contained in the remaining aqueous liquid are insolubilized by cooling down, and the mother-liquor is recycled to dissolve fresh batches of sulphonic acids to be purified.

7. A process according to claim 1, in which an amine is used as the organic base.

8. A process according to claim 1, in which aniline is used as the organic base.

9. A process according to claim 1, in which an organic base is used of such volatility that it can readily be distilled off from the sulphonic compounds which are obtained in the presence of said base.

10. A process for treating an aqueous solution of acid sludge to recover sulphonic acids which comprises treating said acid sludge solution with aniline whereby the aniline reacts with the sulphuric acid and sulphonic acids present in said sludge solution, separating the resulting layers, cooling the upper layer to crystallize out aniline sulphate, and recycling the remaining mother-liquor for treatment of a fresh quantity of aqueous acid sludge solution.

11. A process according to claim 1, in which the insolubilized mass of salt of the organic base is treated with a reagent in order to separate the organic base and the sulphonic acids.

12. A process according to claim 1, in which the insolubilized mass of salt of the organic base is treated with a material selected from the group consisting of magnesium oxide, magnesium carbonate and basic magnesium carbonate in order to separate the organic base from the sulphonic acids.

13. A process according to claim 1, in which the aqueous liquid treated is an aqueous solution of acid sludge.

14. A process according to claim 1, in which the aqueous liquid treated is an aqueous solution of acid sludge from which a substantial part of the free sulphuric acid has been removed by a preliminary treatment.

15. A process according to claim 1, in which the aqueous liquid treated is a residual sulphite liquor.

HYMAN LIMBURG.